United States Patent [19]

Brockhaus

[11] Patent Number: 4,535,828

[45] Date of Patent: Aug. 20, 1985

[54] WINDOW INSULATOR

[76] Inventor: Peter B. Brockhaus, Rte. 1, Owen, Wis. 54460

[21] Appl. No.: 490,466

[22] Filed: May 2, 1983

[51] Int. Cl.³ .............................................. E06B 9/06
[52] U.S. Cl. ............................ 160/84 R; 160/DIG. 7; 160/236
[58] Field of Search ............... 160/DIG. 7, 84 R, 236

[56] References Cited

U.S. PATENT DOCUMENTS 1,937,342 11/1933 Higbie ................................ 160/84 R
1,983,617 12/1934 Ladon ............................ 160/DIG. 7
2,874,612 2/1959 Luboshez ....................... 160/DIG. 7
3,443,860 5/1969 Luboshez ........................... 160/84 R Primary Examiner—Peter M. Caun
Assistant Examiner—Cherney S. Lieberman
Attorney, Agent, or Firm—Fuller, House & Hohenfeldt

[57] ABSTRACT

A thermally efficient window shade that folds into attractive pleats in the raised position. The shade is fabricated from a laminated insulating material composed of encapsulated air bubbles in combination with one or more skins. The shade folding properties are obtained by slitting the laminate partially through the laminate at predetermined locations. The disclosure includes modified versions of the laminated insulating material as well as shade configurations wherein numerous three-sided pockets are formed by the shade to provide small regions of stagnant air. The disclosure further includes apparatus for efficiently slitting a continuous web of the laminated insulating material.

6 Claims, 9 Drawing Figures

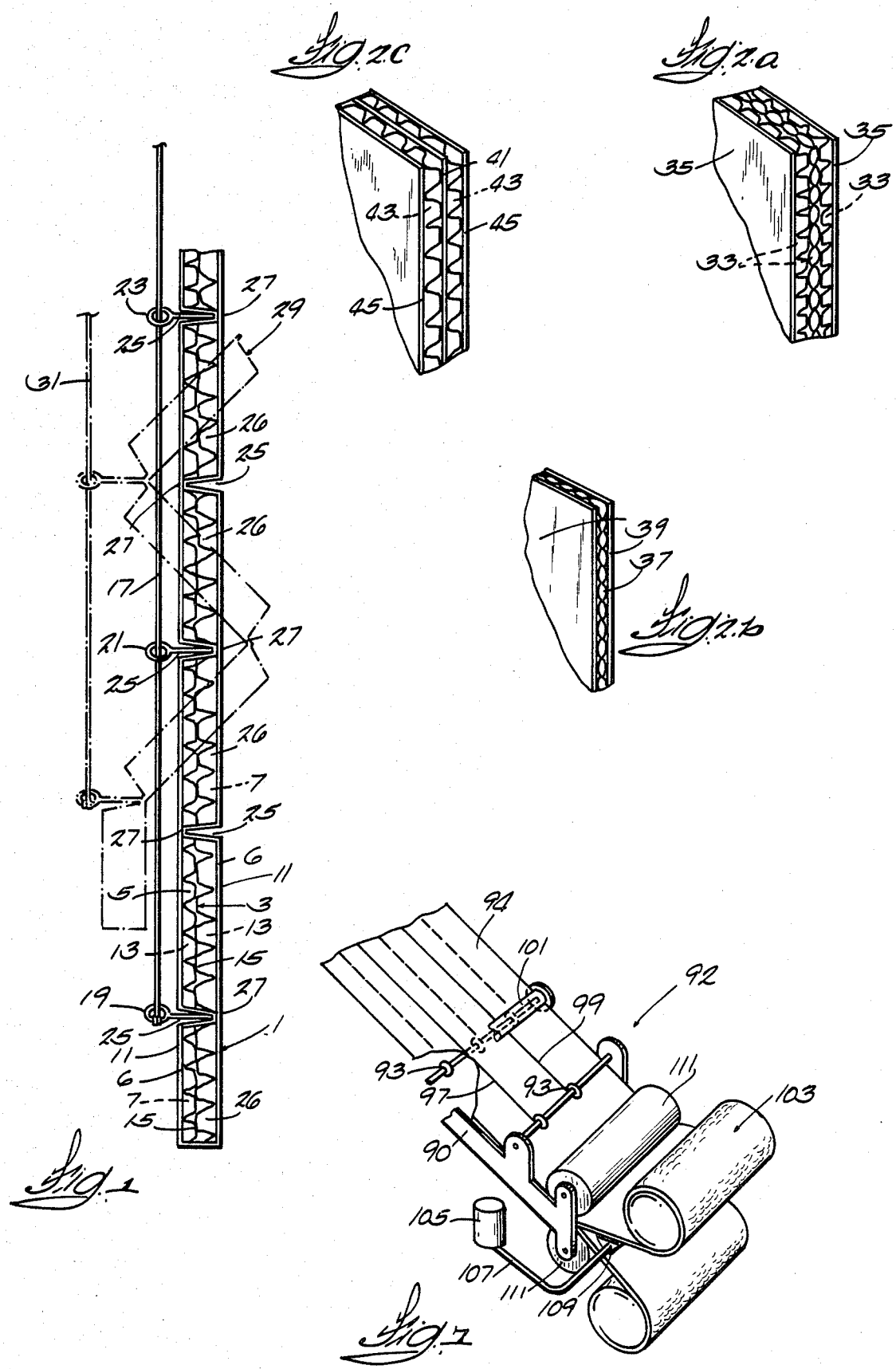

U.S. Patent  Aug. 20, 1985  Sheet 2 of 2  4,535,828
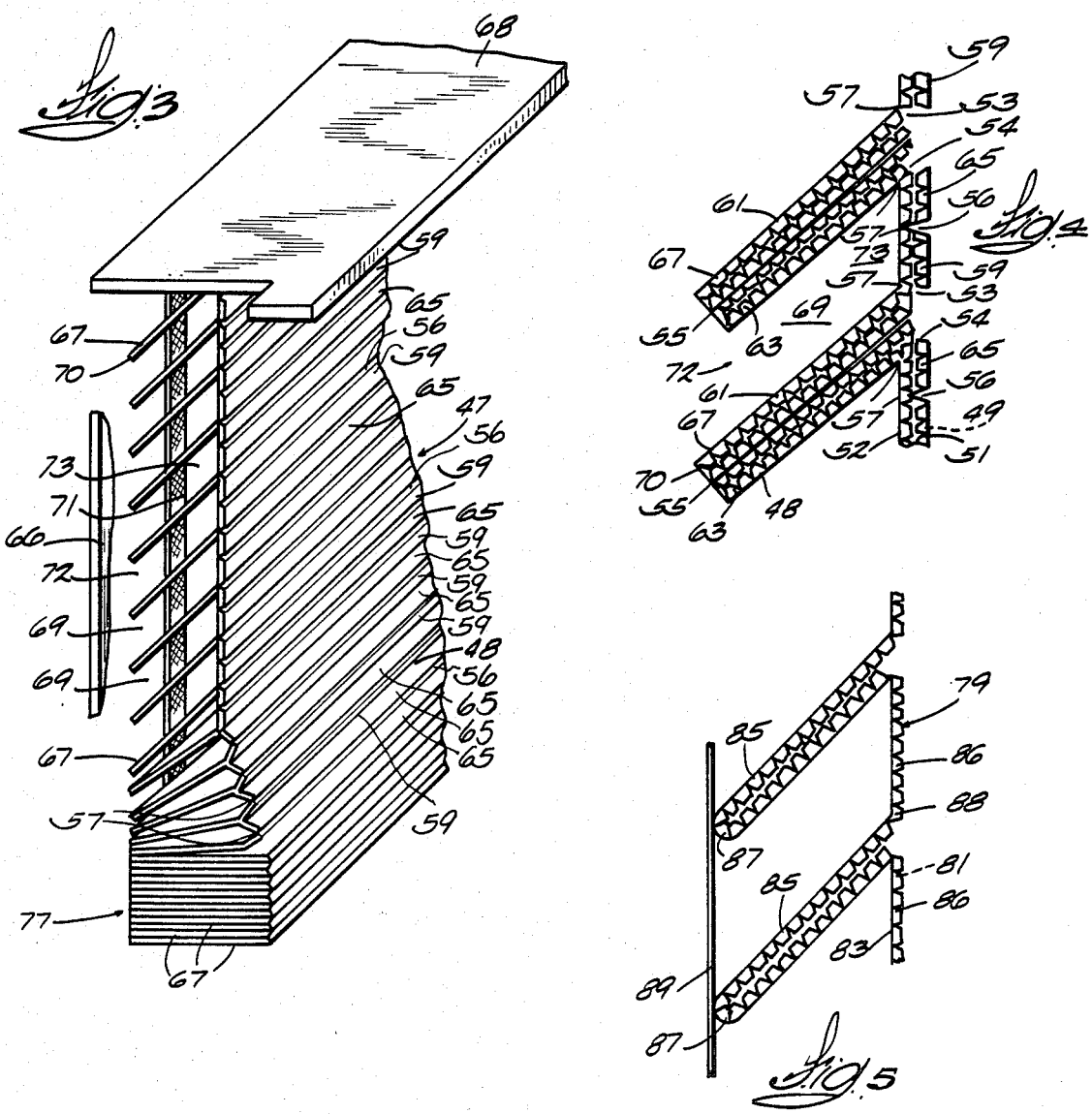
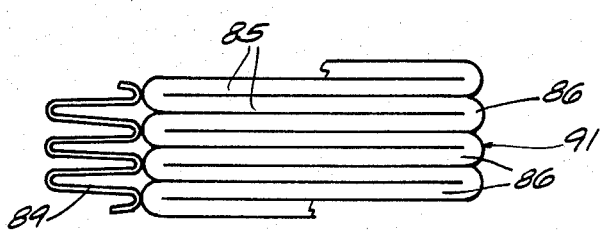

WINDOW INSULATOR

BACKGROUND OF THE INVENTION

1. Field of the Invention

This invention pertains to insulating materials, and more particularly to insulating materials utilized to reduce heat transfer through the doors and windows of a building.

2. Description of the Prior Art

It has long been recognized that heat transfer through glass doors and windows represents a major portion of total building heat gains and losses. For example, a modern home constructed with the latest energy saving materials and methods was the subject of a recent energy loss study. The window area represented only 19% of the floor area, but the windows accounted for 33% of the total heat loss.

Various insulators have been developed to increase window thermal efficiencies by attacking one or more of the contributors to heat transfer: convection, conduction, radiation, and infiltration. The insulators have frequently taken the form of folding window shades, as for example, the well known Roman shade. In the extended position, the shades generally cover the door or window panes and sashes. In many cases the shade sides, top, and bottom are held more or less firmly against the casings by mechanical means such as weights or springs to form seals against infiltration. U.S. Pat. No. 4,335,774 shows a thermal window barrier having spring retained sides. Pull cords of various designs are commonly employed to aid in raising and lowering the shades, as shown, for example, in U.S. Pat. Nos. 3,777,800 and 3,487,875.

If the insulated window shade is used inside a home, esthetic properties of the shade are an important factor. The insulating material is frequently covered with a decorative material to match the room decor. It is also desirable that shades present a neat appearance when in the raised or folded position. This presents a problem with many types of Roman shades. The materials employed are frequently quite thick, often in the neighborhood of one and one-half inches. Raising a thick Roman shade produces folds in it that are frequently bulky and unsightly. U.S. Pat. No. 3,856,072 illustrates the general shape a bulky insulator may assume in the raised position.

The bulky and looped appearance of raised shades may be greatly improved if the shades are fabricated with rather sharply defined pleats. U.S. Pat. No. 4,317,481 illustrates a window shade composed of slats of thermal insulating material attached to a flexible sheet. The slats are spaced apart vertically a slight distance to allow the flexible sheet to fold sharply between the slats. While this folded shade presents a neat appearance, it is costly to fabricate because it requires two separate materials which must be sewn or otherwise joined together. U.S. Pat. Nos. 3,952,788 and 3,487,875 disclose shades that incorporate small reinforcing plates to provide a neat and pleated appearance in the folded position. The use of separate pieces is undesirable because of their cost and because of the cost of adapting the shade fabric to accommodate the pieces.

Accordingly, a need exists for an insulating window shade that is inexpensive, thermally efficient with respect to conduction, convection, radiation, and infiltration, and that presents a neat pleated appearance when in the folded or raised position.

SUMMARY OF THE INVENTION

In accordance with the present invention, a window shade is provided that is thermally efficient, inexpensive, and attractive. The shade is fabricated from an insulating material that inhibits heat transfer by conduction, convection, and radiation. The shade may be designed such that infiltration is also minimized. Further, the shade material serves as an excellent vapor barrier.

The basic insulating material is a laminate of two components. The first component is a double layer of encapsulated air bubbles. Each layer of bubbles may be formed by embossing a thin sheet of synthetic material, such as polyethylene, with numerous closely spaced indentations. The side of the sheet containing the open side of the indentations is bonded to the second component of the insulating laminate, which is a flat skin of thin flexible material. Thus, the air within the indentations is encapsulated into a flat layer of bubbles. The crowns of the encapsulated indentations of two layers of bubbles are bonded together to create a laminate of two layers of bubbles sandwiched between the two outer skins. The skins may be composed of numerous materials, a preferred material being a highly reflective foil.

The laminate has superior insulating qualities. The trapped air within the small encapsulated bubbles prevents convection of the air within the laminate. Heat conduction through the laminate is also very low because of the resistance to heat flow presented by the layers of dead air. The reflective skins reflect heat back into the room and cold back to the outside so that there is minimal heat loss through radiation. Since all of the laminate are imperforate, it is an excellent vapor barrier.

In the preferred embodiment of the window shade of the present invention, the laminate is slit along spaced parallel lines extending the width of the shade. Each slit extends through one skin and both bubble layers, so that only the second skin is left intact. The slits are made on alternate faces of the laminate. By alternating the slits, a plurality of sections are produced that may be sharply folded accordian style. The laminate sections between the slits remain quite stiff. The folded window shade made from the slit laminate thus presents a pleasing appearance when raised.

Numerous modifications of the basic insulating laminate are possible. For example, the laminate may consist of three layers of encapsulated air bubbles interposed between the two outside skins. A second modification may be a single layer of encapsulated bubbles with a skin on both sides. In some applications, a single layer of bubbles and a single skin may be advantageous. The material for each of the laminate components may also vary. For example, the bubbled sheet may be of a reflecting material and the outer skins may be of clear material. A particularly desirable laminate consists of a center sheet of reflective foil with a layer of bubbles and a skin on both sides. This combination provides two layers of air on both sides of the center reflective sheet. This configuration greatly reduces radiant heat transfer.

The present invention is also concerned with fabricating the bubble-skin insulating laminate into window shades that provide enhanced resistance to conduction and convection. This is accomplished, in a preferred embodiment, by bonding a plurality of pairs of adjacent folded-over sections of the slit laminate to form panels which project from unbonded sections between each folded-over and bonded pair. Each unbonded section is slit on the side opposite the projecting bonded panels at the mid-point between the bonded panels, thus creating two intermediate panels.

The window shade is hung so that the intermediate panels hang vertically. The projecting bonded panels are retained parallel to each other, but they slope downwardly away from the vertical intermediate panels toward the window pane. The bonded panels are retained in the parallel sloped position by one or more flexible straps attached to the free end of each panel. The three-sided pockets thus formed create numerous small spaces of dead air that inhibit convection. Cool air from the window side cannot rise within the spaces to contact and cool the vertical intermediate panels, thus reducing conduction. This construction allows the window shade to be lowered so as to fold into a neat stack with the bonded panels lying on top of each other. The vertical intermediate panels fold outwardly at the slits between them to lie in the same stack.

A modification of the enhanced conduction and convection inhibiting window shade of this invention employs an insulating laminate composed of a single layer of bubbles and one skin. This combination of components does not require slitting to create a neatly foldable laminate. Pairs of adjacent sections of the laminate are folded over and bonded to create bonded panels which project from the intermediate panels of laminate therebetween. Because of the flexibility of the single bubble layer and skin laminate, slitting is not necessary. The function and appearance of this shade are very similar to the previously described embodiment. Upon lowering the shade, the bonded panels lie flat on top of each other in a neat stack. The vertical intermediate panels fold outwardly and lie in the same stack.

In accordance with a further aspect of the present invention, apparatus for slitting a continuous web of laminated insulating material is provided. The slitting apparatus includes mechanical or thermal means to accurately slit both sides of the laminate in a continuous longitudinal direction as the laminate travels past a slitting station. Subsequent to the slitting operation, the laminate may be further processed.

Other objects and advantages of the invention will become apparent from the disclosure.

DESCRIPTION OF THE DRAWINGS

FIG. 1 is a cross-sectional view of a window shade constructed according to the present invention, with the continuous lines representing the shade in the lowered position and the phantom lines representing the shade in a partially raised position;

FIG. 2(a) is a partial perspective view of a laminated insulating material of the present invention;

FIG. 2(b) is a partial perspective view of a modification of the laminated insulating material of this invention;

FIG. 2(c) is a partial perspective view of a further modification of the laminated insulating material of this invention;

FIG. 3 is a perspective view of the laminated insulating material fabricated into a window shade having enhanced conduction and convection resistance;

FIG. 4 is an enlarged end view of the window shade of FIG. 3 showing the details of construction;

FIG. 5 is a window shade similar to the shade of FIG. 3, but wherein a modified laminated insulating material is employed;

FIG. 6 is a side view of the window shade of FIG. 5 in a collapsed and folded condition; and FIG. 7 is a diagrammatic view of apparatus for slitting the laminated insulating material.

DESCRIPTION OF THE PREFERRED EMBODIMENT

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

Referring to FIG. 1, reference numeral 1 indicates an insulated window or door shade that includes the present invention. The shade is fabricated from a laminated insulating material generally indicated by reference numeral 3. The laminate preferably consists of two components. The inner component is a thin synthetic sheet 5, such as polyethylene, embossed on one side 6 with numerous closely spaced indentations 7. The indentations may be shaped as short cylinders, but that configuration is not critical. The side 6 of the sheet containing the open sides of the indentations is bonded to the second component of the laminate, which is a thin skin 11. This creates a flat layer of closely spaced encapsulated air bubbles 13. The layer of bubbles in combination with the skin is frequently called a bubble pack, and it finds wide-spread use as a protective packing for delicate products. The crowns 15 of two layers of encapsulated air bubbles are bonded together with a suitable adhesive to form the completed laminate 3.

The laminate material 3 possesses superior insulating qualities. The numerous encapsulated air bubbles 13 act as convection inhibitors to block air convection within the material, thus increasing the resistance to heat transfer. Heat conduction through the laminate is low because most of the volume of the material is dead air. The embossed sheet 5 and skin 11 materials are preferably imperforate synthetics, which render the shade an excellent vapor barrier. To reduce the heat transfer through radiation, the skin is preferably composed of a highly reflective material such as aluminum foil or metalized polyethylene. The laminated material thus described is marketed in the United States by Energy Saver Imports, Limited, Arvada, Colo., under the trademark "Foil Ray". To eliminate air infiltration, the sides, top, and bottom of the window shade may be adapted to snugly fit the window or door frame.

The top of the shade 1 may be attached to the window casing in any suitable manner. In FIG. 1, reference numeral 17 represents one or more pull cords mounted to the window frame by conventional means, not shown. The lower ends of the pull cords are attached to the lower end of the shade 1 by a suitable eyelet or other means 19. Reference numerals 21, 23 indicate additional eyelets for guiding the pull cord. For decorative purposes, the skin 11 facing the inside of the room may be covered with a decorative material, not illustrated.

The two skins 11 act as flanges of a beam, with the layers of bubbles acting as the web of the beam. Therefore, any bending induced in the laminate creates compressive and tensile stresses in the skins, thus tending to make the laminate stiff. As a result, a raised Roman shade made from the laminated insulating material 3 tends to create bulky folds of large radii which are usually considered to be unsightly.

In the preferred embodiment of the present invention, an attractive window shade 1 incorporating the superior thermal efficiencies of the laminated insulating material 3 is produced by forming slits 25 in the laminate. The slits are formed along spaced parallel lines on alternate faces of the laminate. Each slit extends through one skin 11 and through the two layers of bubbles 13. The slits do not extend through the opposite skin. As a result, a plurality of connected sections 26 are produced. The intact skin opposite each slit serves as a hinge 27 which allows sharp accordian style pleating of the laminate sections. Reference numeral 29 indicates the configuration of a partially raised window shade constructed with the pleated slits. Reference numeral 31 indicates a representative pull cord location for a partially raised shade. It is apparent that a window shade constructed according to this invention presents an attractive and neatly folded appearance when raised, and it functions as an efficient thermal barrier when lowered.

The present invention recognizes that in some situations it may be desirable to modify the construction of the laminate. FIG. 2(a) illustrates a laminate composed of three layers 33 of encapsulated bubbles bonded together between two skins 35. In this structure, the skin of the center layer of bubbles is embossed and the indentations in the skin and embossed sheet are aligned so that both sheet and skin contain a portion of the encapsulated air bubbles. FIG. 2(b) illustrates another modification wherein only one layer of bubbles 37 is sandwiched between the outer skins 39. FIG. 2(c) shows a center skin 41 interposed between two layers of bubbles 43 and two outer skins 45. This modification is particularly advantageous if the center skin 41 is made of heat reflective material and the bubbles and outer skins are made of clear material. That is because a reflective surface requires an air space next to it for maximum reflection ability.

It will be appreciated that the materials of the bubbles and skins in all laminate configurations may be modified to suit the requirements at hand. That is, the bubbles may be composed of reflective material and the skins may be of clear material. As indicated, the maximum efficiency against radiant heat transfer is obtained if the encapsulated air spaces are located outside of the reflective surface.

Further in accordance with the present invention, there is provided a window or door shade possessing enhanced resistance to conduction and convection heat transfer. This is accomplished in the present instance by forming the insulating laminate into a multiplicity of three-sided pockets of dead air. Referring to FIGS. 3 and 4, reference numeral 47 indicates generally a window shade fabricated from a continuous laminate 48 of encapsulated bubbles 49 and outer skins 51, 52. The laminate 48 contains parallel spaced-apart slits 53, 54, 56 formed in skin 51 and slits 55 in the skin 52. Each slit 53, 54, 56 extends through skin 51 and both layers of bubbles 49, leaving only opposite skin 52 intact. Each slit 55, extends through skin 52 and both layers of bubbles, leaving only the opposite skin 51 intact. The intact skin opposite each slit creates a hinge 57. The hinges 57 divide the laminate into a repeating pattern of connected panels 59, 61, 63, and 65. Panels 61, 63 are of equal length with each other, and panels 59, 65 are of equal length with each other. Panels 61, 63 are folded onto each other and are bonded together along their contiguous surfaces to form a series of projecting bonded panels 67 with the panels 59, 65 interposed between successive bonded panels. When the window shade 47 is in the raised or operative position, FIG. 3, the intermediate panels 59, 65 hang vertically. The upper end of the shade is attached to a sill 68. The sill 68 is vertically movable by a raising and lowering device not shown, such as a cable and drum arrangement.

To provide even greater resistance to heat transfer by conduction and convection, bonded panels 67 slope downwardly toward the window pane 66, preferably at an angle of about 45°. This forms a plurality of three-sided pockets 69 of dead air. To restrain the bonded panels 67 in a parallel sloped attitude, one or more flexible straps 71 are attached to the free ends 70 of the bonded panels, and the strap is fastened to the sill·68, FIG. 3. Convection losses are minimized because cool air adjacent the window pane stagnates within lower regions 72, FIG. 4, of pockets 69 and is unable to rise to contact the intermediate panels 59, 65. Although some heat may be conducted through the panels 59, 65 to warm the air in the upper region 73 of the pockets, the warm air stagnates in the upper regions 73. This keeps the temperature differential between upper regions 73 and the warm room to a minimum. Simultaneously, the warmer air in upper regions 73 and the cooler air in the lower regions 72 inhibit convection currents from being established within the pockets.

It will be recognized that the shade 47 of this invention is equally suitable for maintaining a room cooler than the outside air. To keep the room cool, the folded panels 67 are oriented upwardly toward the window 66. Warm air on the window side of the shade cannot descend into the pockets to contact the intermediate panels 59, 65. At the same time, the cooler air in the lower regions of the sloping pockets tends to reduce the temperature differential between the pockets and the cool room.

To uncover the window or door, the sill 68 is lowered by the sill operating device, not illustrated herein. The shade 47 folds neatly into a stack 77, as shown in FIG. 3. The bonded panels 67 lie on top of each other. Panels 59, 65 fold outwardly at hinges 57 opposite slits 56 so that they, too, lie neatly adjacent the folded panels 67.

Referring to FIG. 5, reference numeral 79 represents a window or door shade fabricated from a modified laminated insulating material. The laminate consists of a single layer of bubbles 81 and a single skin 83. This laminate configuration is sufficiently flexible so that it bends easily without slitting. The laminate is fashioned into a repeating pattern of folded-over and bonded panels 85 and intermediate panels 86. Prefereably the laminate is folded such that the bubble crowns 88 are bonded. The free ends 87 of the bonded panels 85 are fastened to a flexible strap 89. The top of the shade 79 and the flexible strap 89 are fastened to a vertically movable sill, now shown. When the sill is lowered, the bonded panels 85 collapse into a neat stack 91, and the flexible intermediate panels 86 fold outwardly on top of one another in the stack 91, FIG. 6.

To efficiently slit the laminated insulating material, the present invention includes apparatus that forms all slits in both faces of the laminate in a single operation. Referring to FIG. 7, reference numeral 92 indicates apparatus incorporating a frame 90 for supporting a plurality of slitting tools 93. The slitting tools slit a longitudinally moving web 94 of laminate. The web is transported through the slitting apparatus by conventional means not shown in FIG. 7. The slitting tools 93 are located on both sides of the web 94 at transverse locations on the laminate that correspond to the desired locations of the slits, such as at 97, 99. The preferred construction allows transverse adjustment of the slitting tools. In addition, to provide the proper depth of the slit, the slitting tools are adjustable in the direction perpendicular to the laminate skin.

To accommodate different types of laminate, the type of slitting tools may be varied. For example, in some cases the slitting tools may be sharp rotary knives that mechanically cut the skin and layers of bubbles. In other instances, a hot knife or hot cutter wheel may be preferable. To support the web 94 as it is being slit, a support roller 101 is positioned on the opposite side of the web from the slitting tools 93.

FIG. 7 illustrates the web 94 of laminate being slit by apparatus that also bonds two components supplied from rolls 103, of the laminate together prior to the slitting operation. In the illustrated embodiment, reference numeral 105 represents an adhesive supply. The adhesive is pumped via conventional means through conduit 107 to bonding station 109. After the adhesive is applied, the two individual laminations pass between a pair of pressure rollers 111 to insure intimate contact between the crowns of the encapsulated air bubbles.

Subsequent to the slitting operation, the slit laminate continues to a take-off station, not illustrated in FIG. 7. The laminate may be rolled before shipping or other processing is performed. Alternatively, the slit laminate may be severed into desired lengths which can be stacked for further handling.

Thus it is apparent that there has been provided, in accordance with the invention, a window insulator that fully satisfies the objects, aims, and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

The materials in an effective insulator should be quite thick since efficiency of any insulator is regulated by its thickness, i.e. the thicker the insulator the more effective the thermal barrier. This presents a problem with Roman type shades since the materials employed to make a thick insulator would restrict the operation and result in a bulky and unsightly appearance in the raised position as illustrated in U.S. Pat. No. 3,856,072. For this reason, most window insulators of the Roman shade type are in the neighborhood of 1/16" to 3/10" thick and still produce bulk and unsightly folds in the raised position and are relatively ineffective as a thermal barrier.

In a preferred embodiment of my invention, other insulative materials such as Fiberfil may be added to either side of the laminate to enhance the thermal qualities of the shade.

I claim:

1. Apparatus for inhibiting heat transfer through a building opening having a pane thereover comprising:
    (a) sill means for vertical movement within the building opening;
    (b) a shade fastened to the sill means and hanging substantially vertically therefrom when in a raised operative condition and fabricated from a laminated insulating material having two outer faces and at least two layers of encapsulated air bubbles between the outer faces, each layer of bubbles being encapsulated between a thin sheet of flexible material embossed with a multiplicity of indentations and a skin of thin flexible material bonded to the embossed sheet to encapsulate the air within the indentations, the layers of air bubbles being bonded together with the skins forming the outer faces of the laminate, the shade having a plurality of first and second pairs of panels defined by spaced-apart substantially parallel slits extending across the shade, each slit extending through the laminated material to the skin opposite the slit to allow the panels to fold sharply at the slits, the two panels of each first pair being of substantially equal length with each other and being folded over into facing contact with each other and bonded together along the contacting faces to form a bonded panel having a free end and a hinged end, the two panels of each second pair of panels being of substantially equal length with each other and being interposed between and hinged to successive bonded first pairs of panels, the bonded first pairs of panels being sloped toward the building opening pane when in the raised operative condition to form a plurality of three-sided pockets of stagnant air between the pane and the second pairs of panels; and
    (c) at least one flexible strap fastened to the sill means and to the free end of each bonded first pair of panels to fixedly maintain the sloped attitudes of the bonded first pairs of panels when in the raised condition.

2. The apparatus of claim 1 wherein the material of the skins is highly heat reflective and the material of the embossed sheets is clear polyethylene.

3. The apparatus of claim 1 wherein the material of the skins is clear polyethylene and the material of the embossed sheets is highly heat reflective.

4. Apparatus for inhibiting heat transfer through a building opening pane comprising:
    (a) sill means for vertical movement within the building opening;
    (b) a shade fastened to the sill means and fabricated from a laminated insulating material including a layer of air bubbles encapsulated between a thin sheet of flexible material embossed with a multiplicity of indentations and a skin of thin flexible material bonded to the embossed thin sheet to encapsulate the bubbles within the indentations, the shade having a plurality of sets of first, second, and third panels, the first and second panels of each set being of substantially equal length with each other and being folded over into facing contact with each other and bonded along their facing surfaces to form a bonded panel having a free end and a hinged end, the third panel of each set being interposed between and hinged to successive bonded panels, the bonded panels being sloped toward the building opening pane when in the operative condition to form a plurality of three-sided pockets of stagnant air between the pane and the third panels; and
    (c) at least one flexible strap fastened to the sill means and to the free end of each bonded panel to fixedly maintain the sloped attitude of the bonded panels when in the operative condition.

5. The apparatus of claim 4 wherein the thin skin material is a highly heat reflective material and the embossed thin sheet is clear polyethylene.

6. The apparatus of claim 4 wherein the first and second panels of each set are folded over to bring the embossed thin sheets of flexible material into facing contact with each other for being bonded together.

* * * * *